US006865323B2

(12) United States Patent
Samiec et al.

(10) Patent No.: US 6,865,323 B2
(45) Date of Patent: Mar. 8, 2005

(54) ATHERMAL OPTICAL COUPLER (75) Inventors: Dirk Samiec, Ubstadt-Weiher (DE); Michael Koerdt, Waghäusel (DE); Steven Oliver, Ottawa (CA); Vlatko Milinkovic, Ottawa (CA)

(73) Assignees: JDS Uniphase Corporation, San Jose, CA (US); JDS Uniphase Inc., Ottawa (CA)

( * ) Notice: Subject to any disclaimer, the term of this patent is extended or adjusted under 35 U.S.C. 154(b) by 241 days.

(21) Appl. No.: 10/281,932

(22) Filed: Oct. 28, 2002

(65) Prior Publication Data

US 2003/0128932 A1 Jul. 10, 2003

Related U.S. Application Data

(60) Provisional application No. 60/346,553, filed on Jan. 4, 2002.

(51) Int. Cl.[7] .................................................. G02B 6/26
(52) U.S. Cl. .............................. 385/50; 385/15; 385/39
(58) Field of Search .................. 235/15, 39; 385/50–52

(56) References Cited

U.S. PATENT DOCUMENTS

| 4,864,824 | A | | 9/1989 | Gabriel et al. ................ 60/527 |
| 5,390,266 | A | | 2/1995 | Heitmann et al. ............ 385/44 |
| 5,727,099 | A | | 3/1998 | Harman ........................ 385/52 |
| 5,732,171 | A | | 3/1998 | Michel et al. ................ 385/27 |
| 5,905,824 | A | * | 5/1999 | Delisle et al. ................ 385/15 |
| 5,920,663 | A | * | 7/1999 | Dragone ....................... 385/15 |
| 6,370,310 | B1 | * | 4/2002 | Jin et al. ..................... 385/136 |
| 6,470,119 | B1 | * | 10/2002 | Albrecht et al. .............. 385/50 |
| 2001/0033715 | A1 | | 10/2001 | Delisle et al. ................ 385/37 |
| 2003/0118308 | A1 | * | 6/2003 | Bricheno ..................... 385/129 |

FOREIGN PATENT DOCUMENTS

| EP | 1 087 246 A1 | 3/2001 | ............ G02B/6/34 |
| JP | 62-211979 | 9/1987 | |
| JP | 62-237773 | 10/1987 | |
| JP | 04-116607 | 4/1992 | ............ G02B/6/28 |
| JP | 6138335 | 5/1995 | ............ G02B/6/28 |
| WO | 98/13718 | 4/1998 | |
| WO | 01/07948 A1 | 2/2001 | |
| WO | 01/07949 A1 | 2/2001 | |
| WO | 01/07955 A1 | 2/2001 | |

* cited by examiner

Primary Examiner—Karl D. Frech
Assistant Examiner—April Taylor
(74) Attorney, Agent, or Firm—Allen, Dyer, Doppelt Milbrath & Gilchrist, P.A.

(57) ABSTRACT

The invention relates to an optical coupling device that provides passive compensation for a shift in center wavelength due to a change in ambient temperature. A conventional solution is to mount one of the elements to be coupled on a pedestal or cantilevered arm, which has a coefficient of thermal expansion (CTE) different from a frame fixed relative to the other of the elements to be coupled. Unfortunately, these devices do not provide consistent results over long periods of time, due to uncontrolled movement of the outer free end of the cantilevered arm or pedestal. The present invention provides an expansion arm fixed on one end to a frame, a holder on the other end of the expansion arm, and a pair of flexible arms connecting the holder to the frame. This arrangement enables the expansion arm to freely expand in a first direction, while greatly restricting movement in any other direction. The present invention also relates to a optical coupling device that includes a expansion arm with an adjustable effective length. Furthermore, optical coupling devices are disclosed that include an expansion arm for moving a lens relative to one or more waveguides providing thermal compensation.

20 Claims, 6 Drawing Sheets

ATHERMAL OPTICAL COUPLER

CROSS-REFERENCE TO RELATED APPLICATIONS

This application claims priority from U.S. patent application Ser. No. 60/346,553 filed Jan. 4, 2002.

TECHNICAL FIELD

The present invention relates to optical coupling between waveguides, and in particular to an optical coupler for coupling light between a slab waveguide and an optical fiber which is able to compensate for changes in temperature.

BACKGROUND OF THE INVENTION

Conventional devices used for optical coupling between waveguides, particularly between an integrated waveguide and an optical fiber, have dealt primarily with aligning the different waveguides to obtain maximum optical coupling at room temperature. Unfortunately, a change in ambient temperature causes a change in the properties of the waveguides, e.g. index of refraction, and therefore a shift in the center wavelength of signals transmitted therein.

Figure 1:
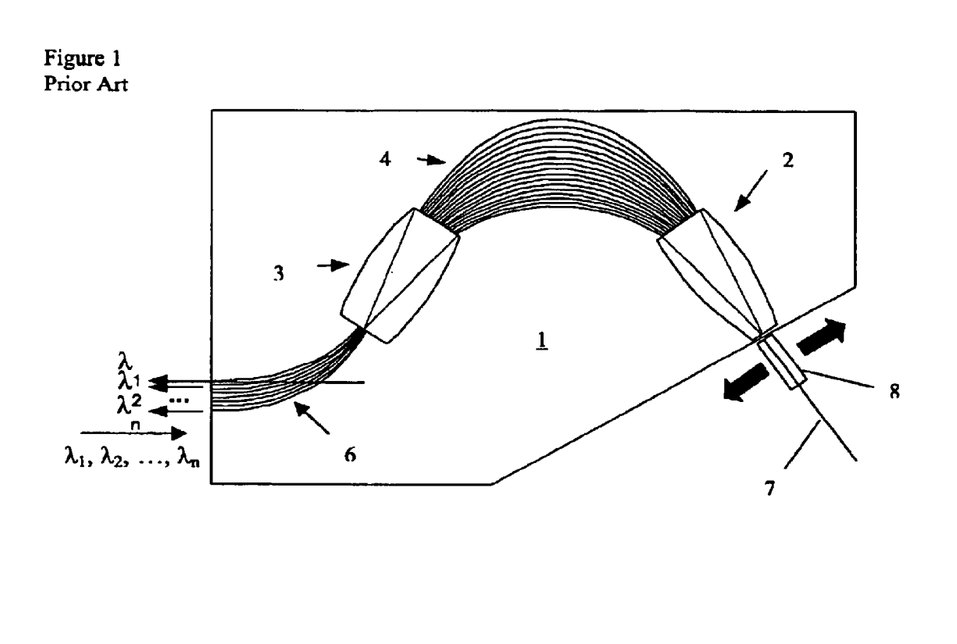
FIG. 1 is a plan view of a conventional slab-launched array waveguide grating (AWG)

A conventional slab-launched array waveguide grating (AWG), illustrated in FIG. 1, is integrated into a substrate 1, and includes a first slab waveguide 2 and a second slab waveguide 3, which are optically connected by an array of discrete waveguides 4. A plurality of discrete input/output waveguides 6 enable signals to be launched into or retrieved from the second slab waveguide 3. As is well known in the art, each of the waveguides 4 has a different length designed so that when a wavelength division multiplexed (WDM) signal is launched into either of the slab waveguides 2 and 3, the signal gets split into sub-beams, which travel along the different discrete waveguides 4 and interfere in the other slab waveguide, thereby creating sub-beams with discrete wavelengths. The discrete wavelengths can be output via the discrete input/output waveguides 6. Of course, this process is completely reciprocal and reversible, i.e. discrete wavelengths launched into either slab waveguide get combined into a single WDM signal for output the other slab waveguide.

Figure 2:
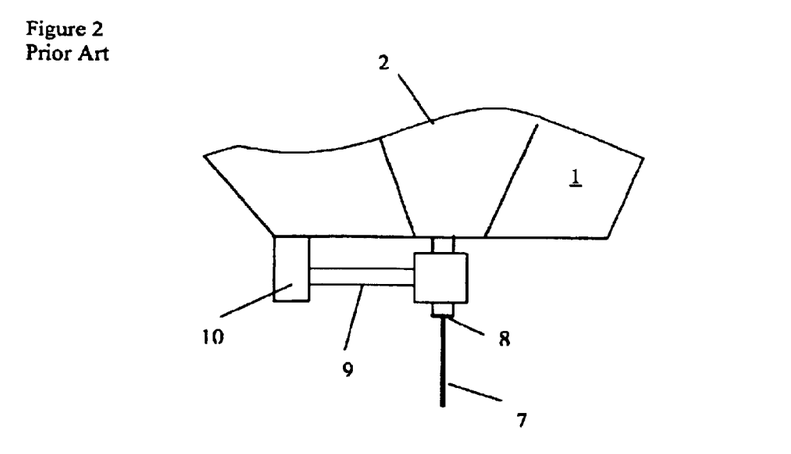
FIG. 2 is a plan view of a conventional temperature compensating coupler.

As is disclosed in Japanese Patent Publication No. 04116607 published Apr. 17, 1992 in the name of Koga Masabumi et al, Japanese Patent Publication No. 06138335 published May 20, 1994 in the name of Takahashi Hiroshi, and several years later in U.S. Pat. No. 5,732,171 issued Mar. 24, 1998 in the name of Herbert Michel et al, it is, advantageous to mount at least one of the slab waveguides at the edge of the substrate to provide immediate access thereto for input or outputting signals. As illustrated in FIG. 1, it is convenient to mount the first slab waveguide 2 at the edge of the substrate 1 for receiving an input WDM signal directly from a fiber waveguide 7, the end of which is encased in a ferrule 8. Typically the ferrule 8 would be fixed directly to the edge of the substrate 1 in the position providing the highest possible optical coupling therebetween at an optimum set temperature. Without active temperature stabilization, changes in temperature encountered in use cause changes in the properties of the waveguides, e.g. the index of refraction, which results in shifts in the center wavelengths of the channels in the output signal. With reference to FIG. 2, various attempts have been made to compensate for optical coupling losses caused by changes in temperature by mounting one of the waveguides 7 on an expansion arm 9 that has a coefficient of thermal expansion (CTE) different than the support 10 fixed to the other waveguide 2. With this arrangement, the shift in the center wavelength caused by the change in temperature is partially or fully compensated for by a relative positional shift of the waveguides resulting from the expansion or contraction of the expansion arm. Examples of these devices are disclosed in Japanese Patent Publication 62211979 published Sep. 17, 1987 in the name of Hanamitsu Kiyoshi, Japanese Patent Publication No. 62237773 published Oct. 17, 1987 in the name of Nomura Hidenori, and World Patent Application WO 98/13718 published Apr. 2, 1998 in the name of Albrecht et al. Because of their cantilevered construction, the outer free ends of these devices are completely unrestrained in any direction. Accordingly, they can be relatively unstable, especially over time.

Improvements on the basic Albrecht et al design are disclosed in World Patent Applications Nos. WO 01/07948, WO 01/07949, and WO 01/07955 all published Feb. 1, 2001 in the name of Schweiker et al. Unfortunately, these applications only disclose spring elements extending in the expansion direction of the expansion arm, and fail to provide the means to restrict the end of the expansion arm from vibrating perpendicularly to the expansion direction.

An object of the present invention is to overcome the shortcomings of the prior art by providing a thermally compensated optical coupler, which is much more stable than the prior art over repeated usage.

SUMMARY OF THE INVENTION

Accordingly, the present invention relates to a device for optically coupling a first waveguide to a second waveguide for transmitting a optical signal defined by a center wavelength therebetween, comprising:

frame means for mounting in a fixed position relative to said first waveguide;

an expansion element, one end of which is connected to said frame means, for expanding or contracting in an expansion direction in response to an ambient temperature change, said expansion element having a coefficient of thermal expansion different than said frame means;

a waveguide block pivotally connected to said frame means by arm means extending substantially perpendicularly to the expansion direction from opposite sides of said frame means, said waveguide block engaged with another end of said expansion element for supporting said second waveguide in a transmission direction relative to said first waveguide;

whereby a shift in the center wavelength due to a change in ambient temperature is at least partially compensated for by movement of the second waveguide relative to the first waveguide resulting from the expansion or contraction of said expansion element.

Another aspect of the present invention relates to a device for optically coupling a first waveguide to a second waveguide via a lens for transmitting an optical signal defined by a center wavelength therebetween, comprising:

frame means for mounting in a fixed position relative to said first waveguide;

an expansion element, one end of which is connected to said frame means, for expanding or contracting in an expansion direction in response to a temperature change, said expansion element having a coefficient of thermal expansion higher than said frame means;

a waveguide block flexibly connected to said frame means and engaged with another end of said expansion element for supporting the lens relative to said first waveguide;

whereby a shift in the center wavelength due to a change in ambient temperature is at least partially compensated for by movement of the lens relative to the first waveguide caused by the expansion or contraction of said expansion element.

Yet another feature of the present invention relates to a device for optically coupling a first waveguide to a second waveguide for transmitting a optical signal defined by a center wavelength therebetween, comprising:

frame means for mounting in a fixed position relative to said first waveguide;

an expansion element, one end of which is connected to said frame means, for expanding or contracting in an expansion direction in response to a temperature change, said expansion element having a coefficient of thermal expansion different than said frame means, said expansion element having an adjustable effective length for presetting the amount of expansion or contraction in response to a given rise in temperature;

a waveguide block engaged with another end of said expansion element for supporting said second waveguide, or a lens optically coupled with said second waveguide, relative to said first waveguide;

whereby a shift in the center wavelength due to a change in ambient temperature is at least partially compensated for by movement of the second waveguide or the lens relative to the first waveguide caused by the expansion or contraction of said expansion element.

BRIEF DESCRIPTION OF THE DRAWINGS

The invention will be described in greater detail with reference to the accompanying drawings which represent preferred embodiments thereof, wherein.

DETAILED DESCRIPTION

Figure 3:
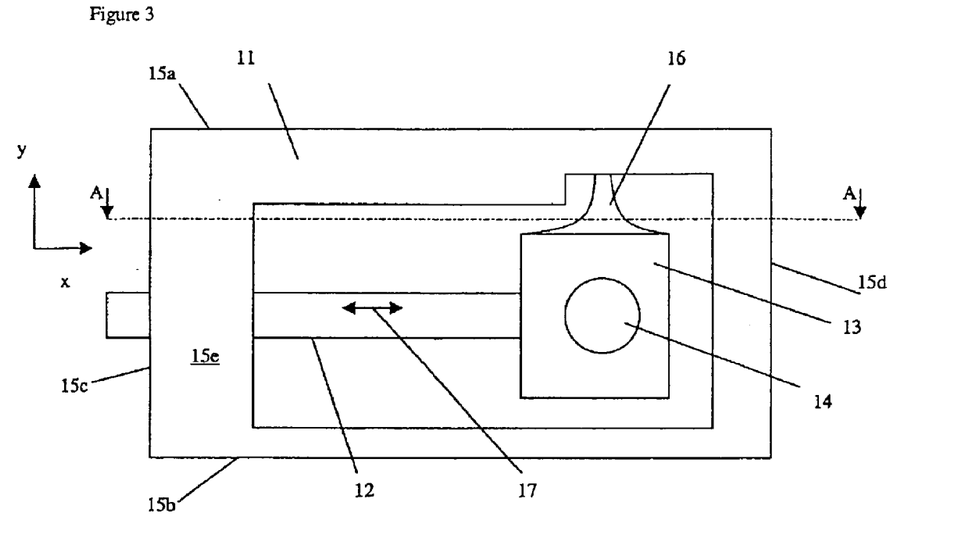
FIG. 3 is a front view of an athermal coupler according to the present invention.

An athermal coupler according to the present invention, which is illustrated in FIG. 3, includes a generally rectangular frame 11, an expansion element 12, and a waveguide block 13. The frame 11 has upper and lower surfaces 15a and 15a, respectively, two sides 15c and 15d, and front and rear faces 15e and 15f, respectively. In this embodiment the upper and lower surfaces 15a and 15b form upper and lower frame members 15a and 15b. One end of the expansion element 12 is fixed to one side 15c of the frame 11, while the other end is fixed to the waveguide block 13. The waveguide block 13 includes a cavity 14 extending therethrough which is adapted to receive a waveguide, e.g. an optical fiber ferrule, or some other element with optical power used to couple light between the waveguides, e.g. a GRIN lens. See FIGS. 6 to 8 for examples of elements supported in the waveguide block 13. The shape of the waveguide block is unimportant to the invention, and is simply a way to fix a waveguide (or a lens, etc.) onto the end of the expansion element 12, whereby the waveguide directs light in a transmission direction into the other waveguide. In fact, the waveguide block 13 could also be integral with the frame 11, if desired. The waveguide block 13 is suspended from the upper frame member 15a by a flexible or resilient arm 16, which extends from the upper frame member 15a to the top of the waveguide block 13. The flexible arm 16 enables the expansion element 12 to move the waveguide block 13 laterally in an expansion/contraction direction indicated by arrow 17, i.e. the x-direction, while preventing the waveguide block 13 from wavering in a direction perpendicular to the expansion/contraction direction, i.e. the y-direction. The flexible arm 16 can be a single rod with a constant or varying cross-section, or a rectangular, planar, web-like member extending in the direction from the front face 15e of the frame 11 to the rear face 15f. In this embodiment the path taken by the waveguide block 13 is somewhat arcuate. Ideally the frame 11 and the waveguide block 13 are integrally manufactured from the same material with a very low CTE, e.g. Invar®, Kovar®, while the expansion element 12 is manufactured from a material with a higher CTE, e.g. an aluminum alloy. Invar® and Kovar® have a CTE less than $10 \times 10^{-6}$ m/m° C. for temperatures ranging from 25° C. to 200° C.

Figure 4:
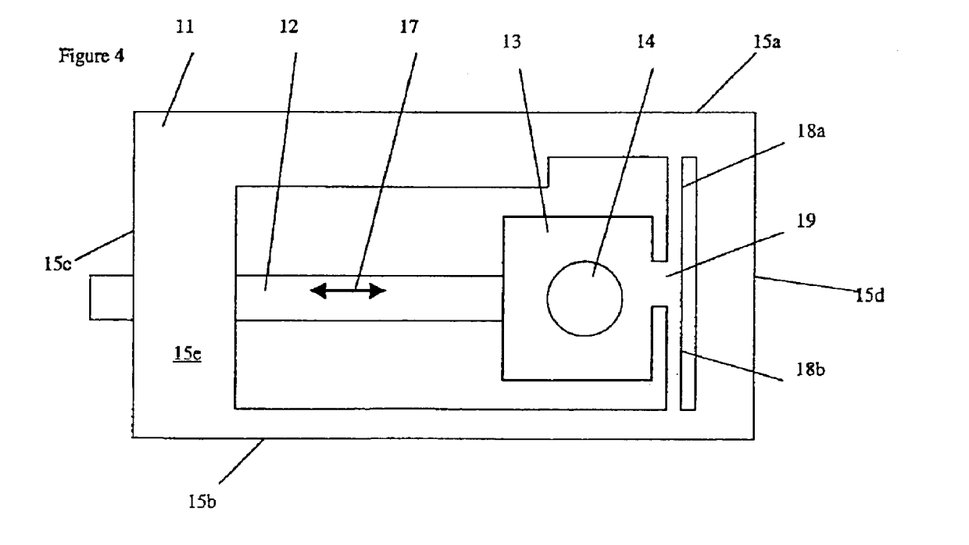
FIG. 4 is a front view of another embodiment of the athermal coupler according to the present invention.

A second embodiment of the present invention, illustrated in FIG. 4, is similar to the aforementioned embodiment except that the flexible arm 16 is replaced with a pair of flexible arms 18a and 18b, joined to the side of the waveguide block 13 opposite the expansion element 12 at joint 19. With this arrangement, the waveguide block 13 is completely restrained from moving in the y direction, i.e. perpendicular to the expansion direction 17, by an arm on either side thereof. The arms 18a and 18b are preferably planar, web-like members joined to the upper frame member 15a and the lower frame members 15b, respectively, and extending from the front face 15e of the frame 11 to the rear face 15f. With this arrangement, the frame 11, the arms 18a and 18b, and the waveguide block 13 can be constructed from a single block of low CTE material. The manufacturing process starts by milling out the voided areas from the front face 15e through to the rear face 15f, thereby making only the front and rear faces 15e and 15f open, while leaving the remaining sides substantially closed. A hole can be provided through the side wall 15c for receiving the expansion element 12.

Figure 5:
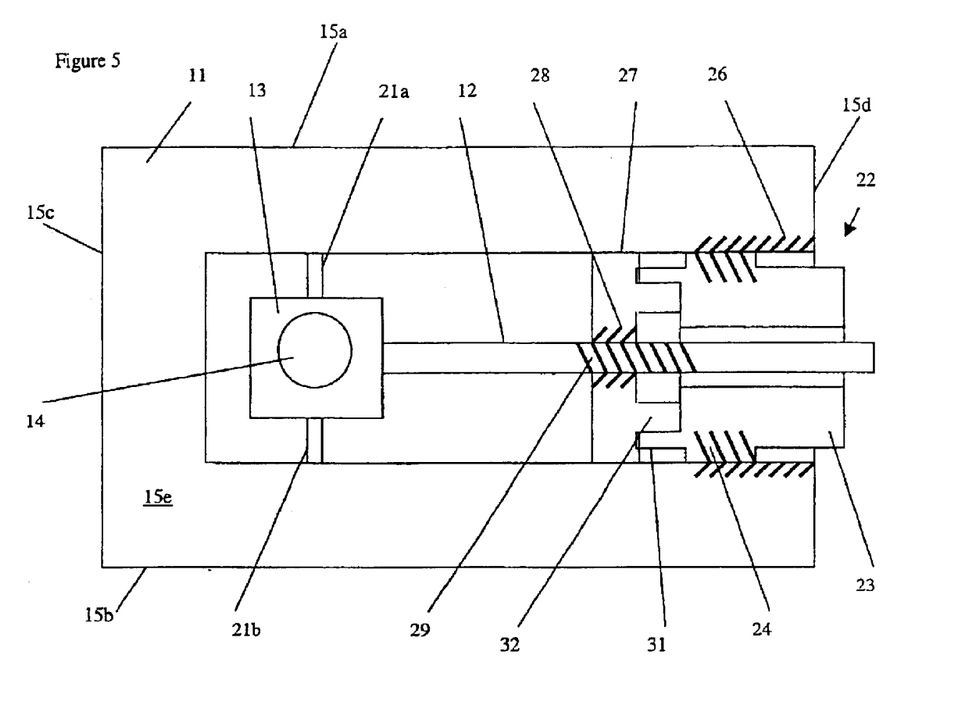
FIG. 5 is front view of another embodiment of the athermal coupler according to the present invention.

FIG. 5 illustrates a third embodiment of the present invention, in which a flexible arm 21a extends from the upper frame member 15a to the top of the waveguide block 13, while a flexible arm 21b extends from the lower frame member 15b to the bottom of the waveguide block 13. The arms 21a and 21b can be a single rod or a planar web-like member extending in the direction from the front face 15e to the rear face 15f of the frame 11. As above, the flexible arms 21a and 21b restrain the waveguide block from moving in the y direction, i.e. perpendicular to the expansion direction 17.

Also illustrated in FIG. 5 is a moveable clamp 22 for adjusting the length of the expansion element 12. The change in length (Δl) of the expansion element 12 is equivalent to the CTE (α) of the expansion element 12 multiplied by the change in temperature (ΔT) multiplied by the length (L) of the expansion element 12, i.e. Δl=αLΔT. Since it is extremely difficult to obtain and mount a plurality of expansion elements 12 having the exact same length (L), it is advantageous to be able to adjust the length (L) of the expansion element 12 so that each optical coupler can be identically tuned. The moveable clamp 22 includes a first sleeve 23 with threads 24 for engaging threads 26 in the frame 11. The moveable clamp 22 also includes a second sleeve 27, slideable in the frame 11, with threads 28 for engaging threads 29 on the expansion element 12. The first sleeve 23 also includes an annular ring 31 for abutting a shoulder 32 formed in the second sleeve 27. Accordingly, rotation of the first sleeve 23 moves the entire moveable clamp 22 into the frame 11, while rotation of the expansion element 12 in the opposite direction withdraws only the expansion element 12, thereby adjusting the effective length (L) thereof, i.e. the distance from the waveguide block 13 to a point at which the threads 28 and 29 last mate.

Figure 6:
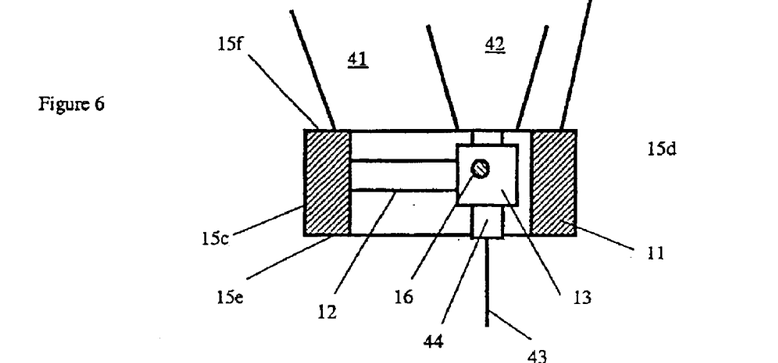
FIG. 6 is a cross-sectional view of the device of FIG. 3 taken along line A—A mounted on an edge of an AWG.

FIG. 6 illustrates a device of the present invention with a frame 11 mounted on the edge of a substrate 41 for aligning a slab waveguide 42 with a fiber waveguide 43, which has one end encased in a ferrule 44. As the ambient temperature rises and falls, the expansion element 12 expands and contracts, which moves the fiber 43 relative to the slab waveguide 42, thereby at least partially compensating for the potential change in center wavelength that would have resulted from the initial change in ambient temperature. As in FIG. 3, the flexible arm 16 prevents the waveguide block 13 from wavering in the direction perpendicular to the expansion/contraction direction.

Figure 7:
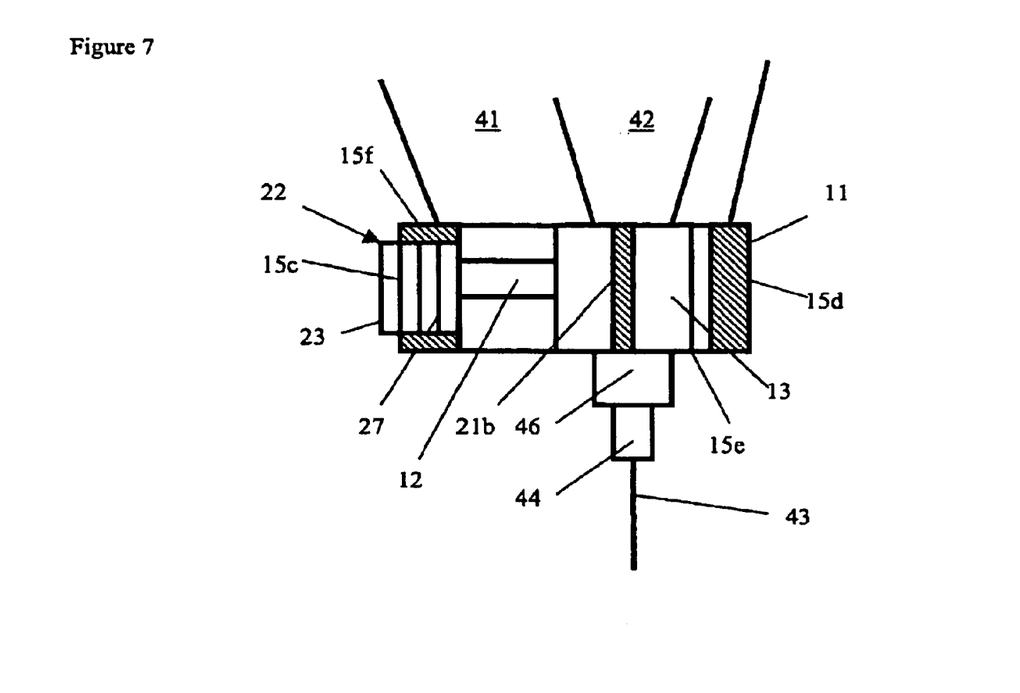
FIG. 7 is a cross-sectional view of a device similar to that of FIG. 5 further comprising a lens mounted on an edge of an AWG.

With reference to FIG. 7, to facilitate installation, a ½-pitch lens 46, e.g. a GRIN lens, is initially mounted in the waveguide block 13, whereby the ferrule 44 with fiber 43 can be easily attached to the lens 46 during installation. Accordingly, installation is made easier by eliminating the need to mount the ferrule 44 or anything else in the waveguide block 13. The embodiment of FIG. 7 includes arms 21a and 21b (only one of which is shown), and the moveable clamp 22 with first and second sleeves 23 and 27, respectively.

Figure 8:
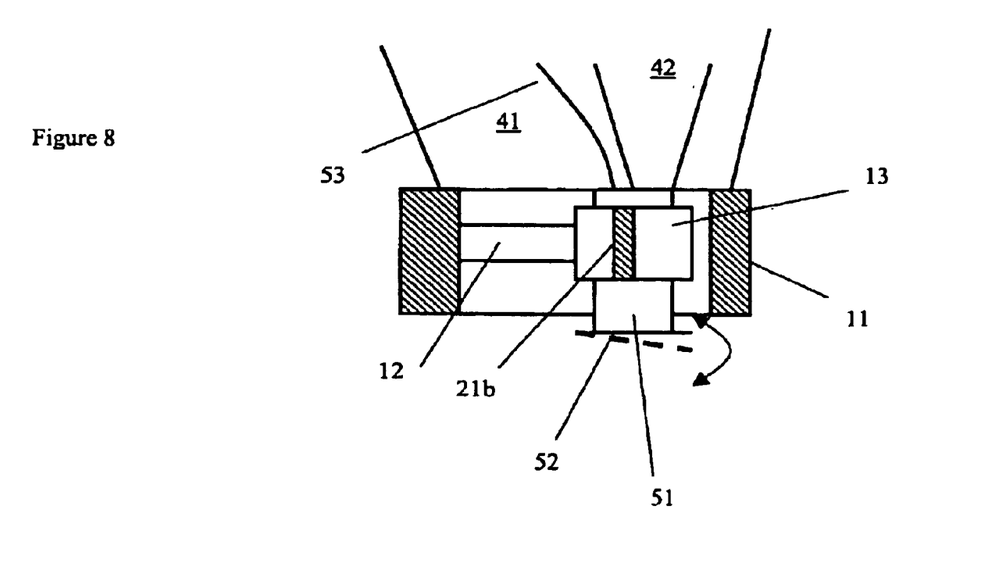
FIG. 8 is a cross-sectional view of a device similar to that of FIG. 5, wherein both waveguides are mounted on a substrate.

FIG. 8 illustrates an alternative embodiment of the present invention in which a ¼-pitch lens 51, e.g. a GRIN lens, is mounted in the waveguide block 13 with a reflective surface 52 positioned or coated on one end thereof. One end of the second waveguide 53, e.g. an optical fiber, can therefore be positioned on the same side of the lens 51 as the first waveguide 42, but still move with the lens 51. Alternatively, the waveguide 53 can be integrated into the substrate 41 with the other end thereof positioned adjacent the input/output waveguides of the AWG device. In this case, neither waveguide would actually move; however, the entry point of the signal into the lens 51 would change, thereby changing the exit point. The lens 51 would be considered the second waveguide, while the integrated waveguide 53 would be a third waveguide. It is also possible for the reflective surface 52 to be pivotable to enable additional tuning. The pivot position can be preset, actively set during use or passively adjusted by a pivoting expansion element. The passive process is fully described in U.S. Patent Publication No. 2001/0033715 published Oct. 25, 2001 in the name of Vincent Delisle et al, which is incorporated herein by reference.

Figure 9:
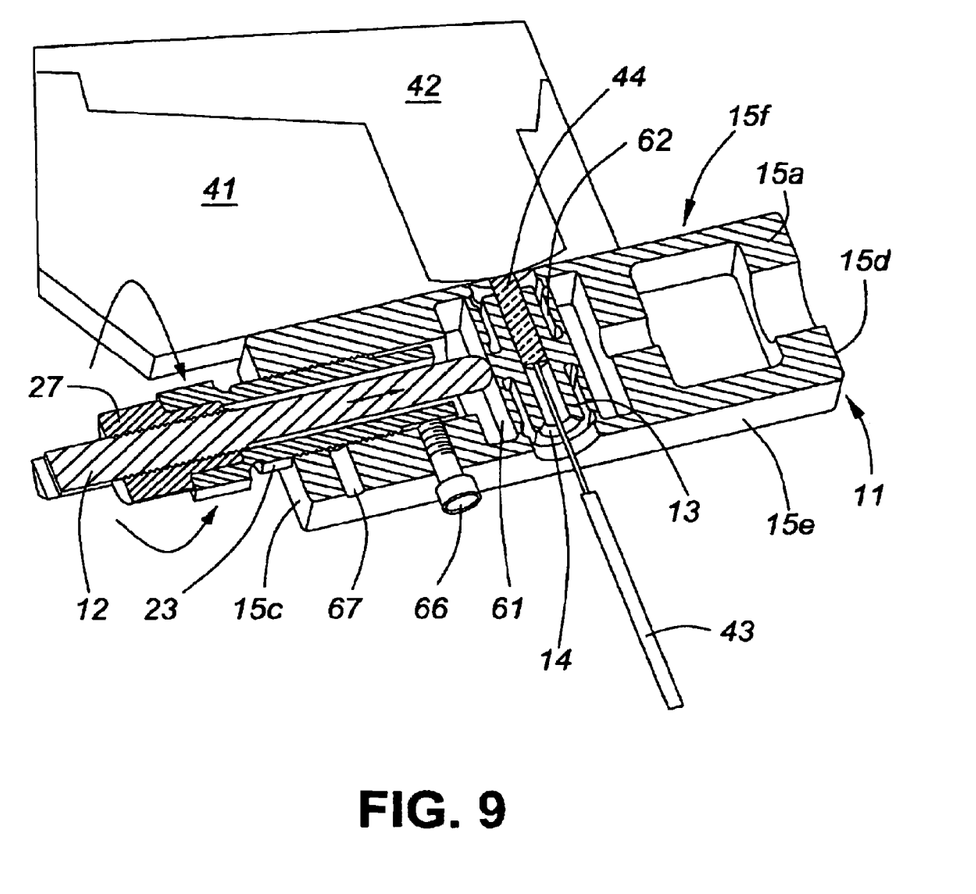
FIG. 9 is a cross-sectional isometric view an alternative embodiment of the athermal coupler according to the present invention.
Figure 10:
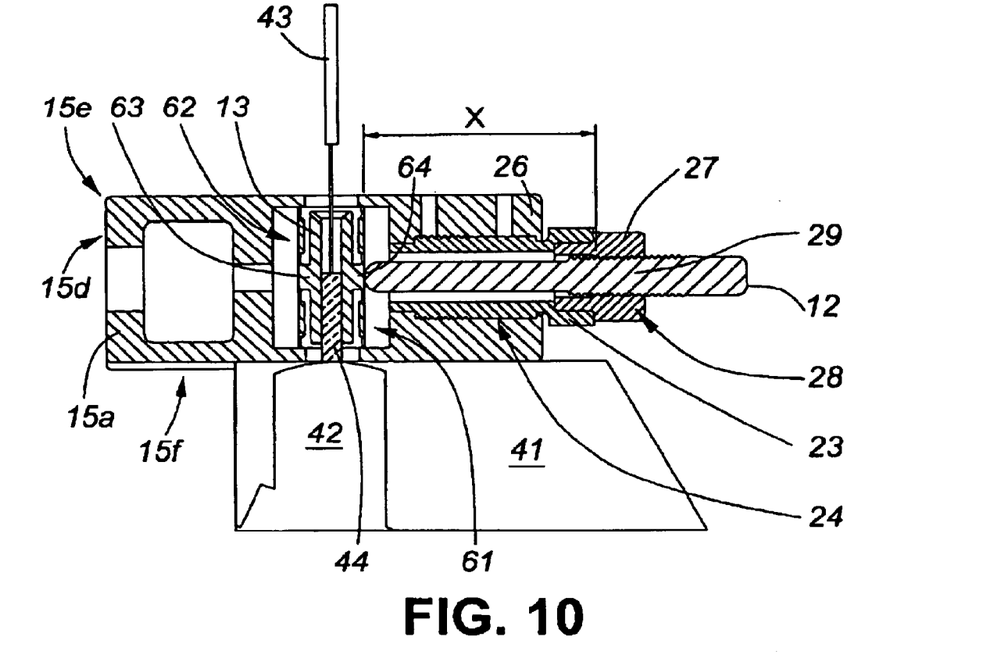
FIG. 10 is a cross-sectional plan view of the device of FIG. 9 in a retracted position.
Figure 11:
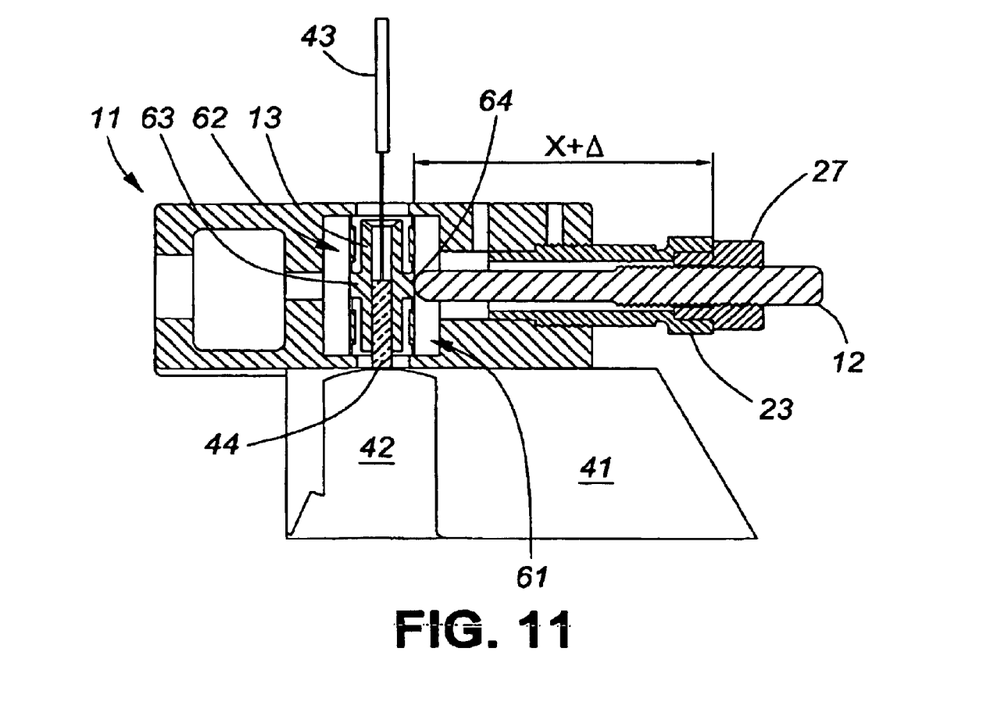
FIG. 11 is a cross-sectional plan view of the device of FIG. 9 in an extended position.

A vastly different approach to the present invention is illustrated in FIGS. 9 to 11. In the previous embodiments, the front and rear faces 15e and 15f of the frame 11 were open, and the arms 16, 18 and 21 flexed about an axis parallel to the longitudinal axis of the waveguide 43, i.e. the transmission direction. Unfortunately, in these embodiments the length of the arms are restricted by the height of the frame 11, i.e. from the upper member 15a to the lower member 15b. Due to a desire to keep the overall package small, the arms were also kept relatively small, which can lead to high stresses at specific locations. However, in the current embodiment the upper and lower frame members 15a and 15b are open, while the front and rear faces 15e and 15f of the frame 11 are closed, except for the cavity 14. The waveguide block 13 is suspended by first and second arms 61 and 62, respectively, which are each joined to the front and rear surfaces 15e and 15f, and which extend from the upper frame member 15a to the lower frame member 15b. With this arrangement, the arms 61 and 62 flex about an axis perpendicular to the longitudinal axis of the waveguide 43, i.e. perpendicular to the transmission direction. Accordingly, the size of the arms are limited by the width of the frame 11, i.e. from the front face 15e to the rear face 15f, not by the height of the frame 11, which can now be kept short.

The arms 61 and 62 are joined to the waveguide block 13 by joints 63 and 64, respectively, which extend from the upper surface 15a to the lower surface 15b. The arms 61 and 62 have broad mid-sections for reinforcement. A set screw 66 is provided for locking the expansion element in position. Other access holes 67 are provided for the insertion of an adhesive to further solidify the structure. As in the previous embodiments, the ferrule 44 is mounted in the waveguide block 13 for launching a signal into the slab waveguide 42 provided in the substrate 41.

The manufacturing process for integrally constructing this embodiment is similar to that of the device of FIG. 4, except the milling is done from the upper surface 15a to the lower surface 15b, leaving the front and rear faces 15e and 15f solid except for a hole drilled for the cavity 14. Again a hole is drilled through one of the sides 15c or 15d to receive the expansion element 12

FIGS. 9 to 11 also illustrate an alternative embodiment of the moveable clamp 22 for adjusting the length of the expansion element 12. In the current embodiment, the positions of the first and second sleeves 23 and 27 are opposite to those in FIG. 5. FIG. 10 illustrates a retracted position, in which the first sleeve 23 has been threaded into the frame 11, and the effective length is X, as shown. FIG. 11 illustrated an extended position, in which the first sleeve has been partially threaded out of the frame 11, while the expansion element 12 has been threaded back into position using the threads on the second sleeve 27. The effective length X+Δ of the expansion element 12 is therefore larger than before by approximately 4 mm or 10%.

We claim:

1. A device for optically coupling a first waveguide to a second waveguide for transmitting a optical signal defined by a center wavelength therebetween, comprising:

frame means for mounting in a fixed position relative to said first waveguide;

an expansion element, one end of which is connected to said frame means, for expanding or contracting in an expansion direction in response to an ambient temperature change, said expansion element having a coefficient of thermal expansion different than said frame means;

a waveguide block pivotally connected to said frame means by arm means extending substantially perpendicularly to the expansion direction from opposite sides of said frame means, said waveguide block engaged with another end of said expansion element for supporting said second waveguide in a transmission direction relative to said first waveguide;

whereby a shift in the center wavelength due to a change in ambient temperature is at least partially compensated for by movement of the second waveguide relative to the first waveguide resulting from the expansion or contraction of said expansion element.

2. The device according to claim 1, wherein said arm means comprise first and second resilient arms extending between said waveguide block and said frame means.

3. The device according to claim 2, wherein the first and second resilient arms extend from opposite sides of said waveguide block.

4. The device according to claim 2, wherein the first and second resilient arms are planar, web-like arms.

5. The device according to claim 4, wherein the first and second resilient arms are fixed to the frame means along axes parallel to the transmission direction.

6. The device according to claim 4, wherein the first and second resilient arms are fixed to the frame means along an axis perpendicular to the transmissions direction.

7. The device according to claim 6, wherein the first and second resilient arms are integral with the waveguide block and the frame means, and constructed from a material having a coefficient of thermal expansion less than $10 \times 10^{-6}$ m/m ° C. for temperatures ranging from 25° C. to 200° C.

8. The device according to claim 1, wherein the first waveguide is a slab waveguide integrated into a substrate; and wherein said frame means is for mounting on the edge of the substrate adjacent the slab waveguide.

9. The device according to claim 1, wherein the second waveguide includes a lens mounted in said waveguide block for optically coupling said second waveguide with said first waveguide.

10. The device according to claim 1, wherein the first or the second waveguide includes a lens with a reflective surface on one end thereof mounted in said waveguide block for optically coupling said first waveguide to said second waveguide.

11. The device according to claim 10, wherein said first waveguide is integrated in a substrate and optically coupled to another end of said lens; and wherein the second waveguide is also optically coupled to the other end of said lens.

12. The device according to claim 11, wherein the second waveguide is a lens for optically coupling the first waveguide with a third waveguide integrated in the substrate.

13. The device according to claim 1, wherein the expansion element has an adjustable effective length for presetting the amount of expansion or contraction in response to a given rise in temperature.

14. The device according to claim 13, further comprising clamping means moveable along said expansion element for adjusting the effective length thereof, said clamping means including first engaging means for engaging said expansion element, and second engaging means for engaging said frame means.

15. The device according to claim 14, wherein said expansion element and said frame means each include threads; wherein said first engaging means has threads for engaging the threads on said expansion element; and wherein said second engaging means has threads for engaging the threads on said frame means.

16. A device for optically coupling a first waveguide to a second waveguide via a lens for transmitting an optical signal defined by a center wavelength therebetween, comprising:

frame means for mounting in a fixed position relative to said first waveguide;

an expansion element, one end of which is connected to said frame means, for expanding or contracting in an expansion direction in response to a temperature change, said expansion element having a coefficient of thermal expansion higher than said frame means;

a waveguide block flexibly connected to said frame means and engaged with another end of said expansion element for supporting the lens relative to said first waveguide;

whereby a shift in the center wavelength due to a change in ambient temperature is at least partially compensated for by movement of the lens relative to the first waveguide caused by the expansion or contraction of said expansion element.

17. The device according to claim 16, wherein the lens has a reflective surface on one end thereof.

18. A device for optically coupling a first waveguide to a second waveguide for transmitting a optical signal defined by a center wavelength therebetween, comprising:

frame means for mounting in a fixed position relative to said first waveguide;

an expansion element, one end of which is connected to said frame means, for expanding or contracting in an expansion direction in response to a temperature change, said expansion element having a coefficient of thermal expansion different than said frame means, said expansion element having an adjustable effective length for presetting the amount of expansion or contraction in response to a given rise in temperature;

a waveguide block engaged with another end of said expansion element for supporting said second waveguide, or a lens optically coupled with said second waveguide, relative to said first waveguide;

whereby a shift in the center wavelength due to a change in ambient temperature is at least partially compensated for by movement of the second waveguide or the lens relative to the first waveguide caused by the expansion or contraction of said expansion element.

19. The device according to claim 18, further comprising clamping means moveable along said expansion element for adjusting the effective length thereof, said clamping means including first engaging means for engaging said expansion element, and second engaging means for engaging said frame means.

20. The device according to claim 19, wherein said expansion element and said frame means each include threads; wherein said first engaging means has threads for engaging the threads on said expansion element; and wherein said second engaging means has threads for engaging the threads on said frame means.

* * * * *